United States Patent [19]

Maurer et al.

[11] 3,854,735

[45] Dec. 17, 1974

[54] STATIC FACE SEAL

[75] Inventors: William C. Maurer; Everett H. Lock, both of Houston, Tex.

[73] Assignee: Exxon Production Research Company, Houston, Tex.

[22] Filed: Oct. 24, 1972

[21] Appl. No.: 300,074

[52] U.S. Cl.............. 277/189, 277/170, 285/357, 277/188
[51] Int. Cl............................................. F16j 15/06
[58] Field of Search............ 285/356, 357, 363–368; 220/46 R; 277/180–190, 237, 166, 235, 236, 151, 168, 170, 144

[56] References Cited
UNITED STATES PATENTS

| | | | |
|---|---|---|---|
| 1,631,654 | 6/1927 | Stoffel | 285/363 |
| 3,436,085 | 4/1969 | Polk | 277/187 |

*Primary Examiner*—Samuel B. Rothberg
*Assistant Examiner*—Robert I. Smith
*Attorney, Agent, or Firm*—Robert L. Graham; James A. Reilly

[57] ABSTRACT

A static face seal for sealing the clearance gap between a pair of radial surfaces including an elastomeric seal ring, a plastic backup ring, and a soft metal anti-extrusion ring. The anti-extrusion ring includes a first portion defining an axially extending surface and a second portion defining an outwardly sloping surface. The anti-extrusion ring is adapted to fit snugly into a groove having an outer surface complementary to the axially extending and sloping surfaces of the anti-extrusion ring.

14 Claims, 3 Drawing Figures

3,854,735

STATIC FACE SEAL

BACKGROUND OF THE INVENTION

1. Field of the Invention

This invention relates to static face seals. In one aspect it relates to a three ring seal assembly. In another aspect, it relates to an improved anti-extrusion ring for static face seals.

2. Description of the Prior Art

The function of a static seal is to separate pressurized fluids at the joint of two non-moving members. The seal normally comprises a sealing element such as an O-ring mounted in a gland defined by the joined members. When the seal is employed at the interface of a pair of planar, radially extending surfaces, it is normally referred to as a face seal. Such seals are frequently used in the assemblage of members that must be disconnected from time to time to permit repair or replacement of parts or to provide access to the interior of the assembly. Typically, face seals are used in a variety of fittings such as flange fittings, plug fittings, cap fittings, and the like. Face seals also are used between components of pumps, swivels, valves, and other fluid handling devices.

A serious problem associated with static seals, particularly those employing elastomeric O-rings, is that of extrusion. High pressures tend to force the members being joined apart causing the O-ring to extrude through the the clearance gap with the result that the O-ring is damaged or the seal is blown out. Extrusion is particularly serious under cyclic loading such as that encountered in reciprocating pumps.

A commonly applied remedy for O-ring extrusion involves the use of anti-extrusion rings. These rings are normally thin annularly shaped members composed of much harder material than the O-ring and are mounted in the gland so as to provide zero clearance at the interface of the joined members. A particularly useful anti-extrusion ring for high pressure service is the wedge shaped ring frequently referred to as a delta ring. This ring has a triangular cross-section and has an outer beveled surface. The beveled surface is adapted to mate with a complementary shaped surface formed in a wall portion of the mounting groove. Under hydraulic loading, the O-ring bears against the delta ring wedging it into the clearance gap separating the members being joined. The delta ring in effect provides a metal-to-metal contact across the clearance gap. Experience with these rings however has shown that the rings are difficult to retain in the groove during installation. The delta rings, because of the beveled surface, tend to become dislodged from their mounting grooves when the member in which the ring is installed is tilted downwardly. Although adhesives can be used to retain the delta rings in place, this procedure is time consuming and cumbersome and is not recommended in applications such as pump packing where it is desired to replace the packing and return the pump to operation as quickly as possible.

SUMMARY OF THE INVENTION

The present invention provides an improved face seal assembly comprising an elastomeric seal ring, a plastic backup ring, and a soft metal anti-extrusion ring. A novel feature of the invention resides in the configuration of the anti-extrusion ring. This ring and the groove containing it have complementary shaped portions which permit the ring to be frictionally retained within the groove thereby facilitating installation. The anti-extrusion ring includes outwardly tapering portion which provides a metal-to-metal contact which under loaded conditions provides the wedging action at the joint of the members being joined. The contact pressure increases in response to internal fluid pressure much in the same manner as delta rings.

The three rings comprising the face seal are adapted to be concentrically positioned in an axially opening groove formed in one of the gland members. The elastomeric ring is the inner ring in the concentric arrangement and provides the initial seal for internal pressure. The plastic ring is intermediate the other two rings and provides a secondary seal for the assembly. It also serves to transmit hydraulic forces uniformly to the anti-extrusion ring and to plug minute openings between the anti-extrusion ring and the gland members confining it. The anti-extrusion ring is the outer ring of the assembly and serves to close the clearance gap between the members being joined and thereby prevents the extrusion of the other rings. In a preferred embodiment, the anti-extrusion ring is confined within the mounting gland under compression and thus itself functions as a sealing element.

DESCRIPTION OF THE PREFERRED EMBODIMENTS

The present invention will be described in connection with a static face seal for a plunger pump packing cartridge. It will be appreciated by those skilled in the art, however, that the improved seal assembly and improved anti-extrusion ring can be used in other high pressure applications.

Figure 1:
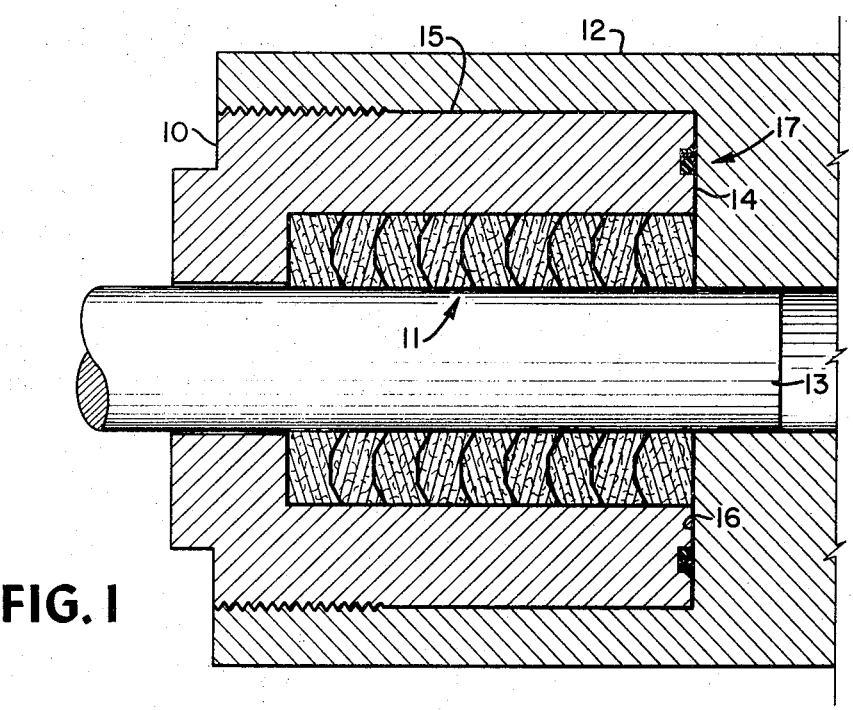
FIG. 1 is a longitudinal sectional view of a portion of a plunger pump provided with the static face seal assembly of the present invention.

With reference to FIG. 1, a packing cartridge 10 containing packing 11 is shown threadedly connected to the fluid end body 12 of a plunger pump. The packing 11 contained in the packing cartridge 10 surrounds a plunger 13 and provides a dynamic seal therefor. The cartridge 11 is a hollow cylindrical member having a flat forward end 14 and a generally cylindrical outer surface 15. The cartridge 10 is sized to fit into a recess formed in an endportion of body 12 and terminating in a radially extending end wall 16.

A face seal assembly 17 provides a static seal between mated surfaces 14 and 16. The term "face seal" as used herein refers to a seal employed at the interface of two radially extending planar surfaces. In high pressure service, a face seal is preferred over other types of seals such as a bushing seal because it can be preloaded thereby creating a high pressure seal zone. Such seals, however, are difficult to maintain because high pressure, particularly a fluctuating pressure, tends to force the mated surfaces apart.

Figure 2:
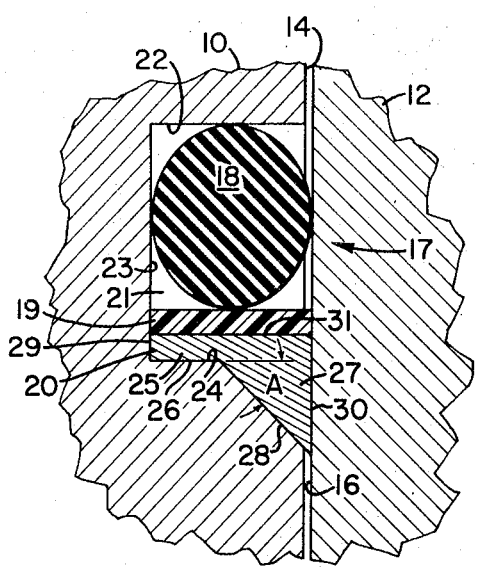
FIG. 2 is an enlarged sectional view of the static face seal assembly shown in FIG. 1.

The improved face seal assembly constructed according to the present invention and illustrated in FIG. 2 comprises an elastomeric seal ring 18, a plastic ring 19, and a soft metal anti-extrusion ring 20. The three ring assembly is adapted to be mounted in a specially configured groove 21 formed in the face 14 of cartridge 10. The groove 21 is of generally annular configuration having an inner, axially extending wall 22, a flat bottom 23, and an outer wall 24 shaped to cooperate with the anti-extrusion ring 20.

The elastomeric seal ring preferably is a conventional O-ring. Such rings are inexpensive and available in a variety of sizes. The O-ring can be composed of natural rubber, polyisoprene, polybutadiene, ethylene-propylene rubber, neoprene, acrylonitrile-butadiene, and the like.

The plastic backup ring can be of rectangular cross-sectional configuration as illustrated in FIG. 2. Although a variety of plastics are useable as a backup for the O-ring, preferred material is a fluoroplastic such as polytetrafluoroethylene (teflon). As described in detail below, the teflon ring under high stress tends to cold flow and seal minute clearance gaps between the anti-extrusion ring and its contact surfaces.

As mentioned earlier, the anti-extrusion ring 20 is composed of a soft metal. Suitable metals including bearing metals having a tensile strength less than about 40,000 psi and a Brinnel hardness number less than about 100. Examples of such metals include bronze, bronze alloys, and copper alloys. These metals are strong enough to withstand the compressive forces imposed thereon and yet are capable of deforming to close the clearance gap between the members being joined. The anti-extrusion ring 20 includes a first portion 25 defining an axially extending outer surface 26 and a second portion 27 defining an outwardly sloping shoulder 28. The outer wall 24 defining groove 21 is configurated complementary to surfaces 26 and 28 so that the ring 20 fits snugly on the outer wall 24. The first portion 25 terminates in a flat radial surface 29 which in one embodiment is adapted to engage the bottom 23 of groove 21. The outside diameter of the first portion 25 defined by surface 26 is sized in relation to the groove 21 so that the anti-extrusion ring 20 is retained within the groove by the frictional engagement of surface 26 on the outer wall 24. The fit between the two surfaces should preferably be between a zero allowance and a 0.004 negative allowance. Preferably, this fit will be between 0.001 and 0.003 negative allowance.

The forward end of the anti-extrusion ring 20 terminates in a flat annular surface 30 which is adapted to sealingly engage surface 16 of member 12. The axial dimension of the ring 20 as measured between surfaces 29 and 30 is preferably slightly greater than the depth of groove 21. Thus when the members 10 and 12 are joined together, the anti-extrusion ring 20 is retained under compression. The axial dimension of the ring 20 in the unstressed condition preferably should be between about 0.001 inches and 0.006 inches greater than the depth of the groove 21. The radial dimension of the portion 25 should be sufficient to withstand the compressive forces exerted on the ring 20. Thicknesses will vary depending upon the size of the ring but will normally be between about 0.060 inches and 0.030 inches.

The slant angle, indicated as A in FIG. 2, between the surface 28 and the axis of the ring 20 should be selected to provide the wedging action necessary to prevent extrusion of the plastic ring 19. This angle should be between about 50° and about 30° with 45° being preferred. The inner surface 31 of ring 20 is preferably circular and is adapted to mate with the outer surface of the plastic backup ring 19.

The radial dimension of groove 21 as measured between its inner wall 22 and the axial extending portion of its outer wall 24 is sized in relation to the three ring assembly. As indicated above, the anti-extrusion ring 20 provides an interference fit with wall 24. The outer diameter of plastic ring 19 and the inner surface 31 of anti-extrusion ring 20 are sized to provide zero clearance between the two mating surfaces. The O-ring 18 is sized to fit snugly between the inner wall of plastic ring 19 and the wall 22 of groove 21. The three ring assembly is thus snugly maintained in the groove 21 permitting the cartridge to be mounted on the pump without fear of the assembly or any component thereof dislodging from the groove 21. The radial dimension of plastic ring 19 preferably is about the same as that of the axial extending portion 25 of ring 20 whereas the cross-sectional diameter of the O-ring 18 is slightly larger than the radial dimension separating wall 22 and the inner wall of plastic ring 19. The O-ring 18 protrudes a short distance above the other two rings in the unstressed condition. When the cartridge 10 is mounted on the pump body 12, and the mating surfaces 14 and 16 are drawn together as the cartridge is screwed into the pump body 12, the O-ring 18 is deformed slightly and compressed into the space separating plastic ring 19 and wall 22. This provides the initial seal for the assembly. As the surfaces 14 and 16 are brought closer together, the plastic ring 19 and anti-extrusion ring 20 are also compressed slightly creating high contact pressures between surface 30 and surface 16. This contact pressure in combination with the plastic backup ring 19 prevents the O-ring 18 from extruding through the clearance gap between the mated surfaces. Fluid pressure applied to the O-ring 18 deforms the O-ring forcing it against the plastic ring 19. At extremely high pressures the plastic ring behaves much in the manner of the viscoelastic fluid transmitting forces uniformly along the inner surface 31 of the anti-extrusion ring 20. These radially acting forces cause the tapered portion 27 of ring 20 to move upwardly along the beveled edge of the outer wall 24 further increasing the contact pressure of surface 30 on the pump body 12.

Figure 3:
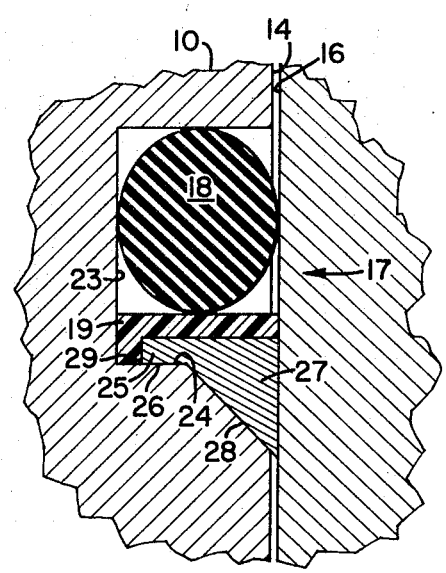
FIG. 3 is an enlarged sectional view of another embodiment of the static face seal assembly.

An alternate form of the anti-extrusion ring 20 is illustrated in FIG. 3. In this embodiment the seal assembly 17 is identical to that illustrated in FIGS. 1 and 2 except axial portion 25 is truncated so that bottom surface 29 does not contact the bottom of groove 21. In this arrangement, the plastic ring 19 seals the interface between wall 24 of groove 21 and surface 26 of the anti-extrusion ring 20.

The above tests demonstrate that the face seal of the present invention provides a highly reliable seal and, because of its unique construction, provides a convenient assembly which enables the parts to be assembled with ease.

It should be emphasized that the anti-extrusion ring 20 in either the embodiment of FIG. 2 or FIG. 3 can be used in combination with the plastic ring 19 and O-ring 18 as illustrated above or in combination with other types of sealing elements.

The dimensions, configurations, and choice of material, of the three ring assembly described above can vary within relatively wide limits depending upon the operating conditions. One example of a specific design of the assembly that has performed extremely well in providing static face seals for a plunger pump packing cartridge is described below (numerals are with reference to FIG. 2):

Groove (21)

| | |
|---|---|
| Diameter of wall (22), inches | 4.712 |
| Diameter of wall (24), inches | 5.500 |
| Depth, inches | .237 |
| Slope of beveled edge, degrees | 45 |

O-ring (18)

| | |
|---|---|
| Material | Nitrile, 90 Durometer Rubber |
| Nominal size, inches | 5¼ × 4¾ × ¼ |

Plastic Ring (19)

| | |
|---|---|
| Material | Teflon |
| Outside Diameter, inches | 5.375 |
| Inside Diameter, inches | 5.250 |
| Height, inches | .237 |
| Thickness, inches | .062 |

Anti-Extrusion Ring (20)

| | |
|---|---|
| Material | SAE 660 Bronze |
| Diameter - Surface (31), inches | 5.375 |
| Height - Surface (31), inches | .243 |
| Diameter - Surface (26), inches | 5.501 |
| Height - Surface (26), inches | .112 |
| Angle (A), degrees | 45 |

The cartridge 10 containing the three ring face seal 17 was installed on a reciprocating pump having a 3½ inch (diameter) plunger. The plunger pump was employed to pump drilling fluid at a pressure ranging between about 9,000 and 10,000 psi at an average temperature of about 150° F. The plastic ring 19 was first positioned within the anti-extrusion ring 20 and this assembly was then forced into the groove 21 of cartridge 10. The interference fit between the ring 20 and groove wall 24 required the application of a slight amount of force but readily lodged in the groove by hand manipulation. (Negative allowance greater than about 0.003 inch may require tamping the ring 20 into place.) The O-ring 18 then was forced into the groove 21. The three ring assembly retained in position by interference between adjacent surfaces permitted the manipulation of the cartridge 10 without danger of the rings falling out. This insured that the rings remained properly positioned as the cartridge was screwed into the pump body 12.

A similar test was performed using a face seal illustrated in FIG. 3. The only difference between this seal and those previously tested was the anti-extrusion ring 20. The ring 20 was of the same material and dimensions as above except the height of surfaces 31 and 26 were 0.180 and 0.049 respectively. The pump was operated for 25 hours without failure to the face seal.

We claim:

1. A static face seal assembly for sealing the junction of a pair of radially extending surfaces, one of said surfaces having a groove formed therein, said groove being defined in part by an outer axially extending wall having a beveled edge, said static face seal assembly comprising a seal ring disposed in said groove for sealing the clearance gap between said pair of radially extending surfaces; a soft-metal anti-extrusion ring having a first portion which defines an axially extending surface sized to fit in close conformity with said axially extending wall of said groove, and a second portion which defines an outwardly sloping shoulder adapted to engage said beveled edge in said one of said surfaces and the other of said surfaces to prevent extrusion of said seal ring.

2. An anti-extrusion ring as defined in claim 1 wherein said anti-extrusion ring is composed of a metal having a Brinnel hardness less than about 100.

3. An anti-extrusion ring as defined in claim 2 wherein said first portion is sized to provide interference fit with said axially extending wall.

4. An anti-extrusion ring as defined in claim 2 wherein the allowance between said axially extending surface of said first portion and the axially extending wall of said groove is between 0 and a negative 0.004 inches.

5. An anti-extrusion ring as defined in claim 2 wherein the sloping shoulder of said second portion defines an angle of between about 50° and about 30° with the axis of said anti-extrusion ring.

6. An anti-extrusion ring as defined in claim 2 wherein the radial dimension of said first portion is at least 0.030 inches.

7. An anti-extrusion ring as defined in claim 2 wherein said anti-extrusion ring has an axial dimension slightly greater than the depth of said groove.

8. An anti-extrusion ring as defined in claim 7 wherein the axial dimension of said anti-extrusion ring is from 0.001 to 0.006 greater than the depth of said groove.

9. A static face seal assembly for use in sealing the clearance gap between a pair of radially extending surfaces, one of said surfaces having a groove formed therein, said groove being defined in part by an outer axially extending wall having a beveled edge, said static face seal assembly comprising an elastomeric seal ring disposed in said groove, a soft metal anti-extrusion ring having a first portion which defines an axially extending surface sized to fit in close conformity with said axially extending wall of said groove, and a second portion which defines an outwardly sloping shoulder adapted to engage said beveled edge; and a plastic backup ring interposed between said elastomeric seal ring and said anti-extrusion ring.

10. A static face seal assembly as defined in claim 9 wherein said anti-extrusion ring is composed of a metal having a Brinnel hardness less than about 100.

11. A static face seal assembly as defined in claim 10 wherein said anti-extrusion ring has an axial dimension slightly greater than the depth of said groove.

12. A static face seal assembly as defined in claim 10 wherein said elastomeric seal ring, said plastic backup ring, and said anti-extrusion ring are arranged concentrically within said groove, each ring being sized to protrude axially beyond said groove and adapted to engage the other of said surfaces.

13. A static face seal assembly as defined in claim 12 wherein said elastomeric seal ring is an O-ring.

14. A static face seal assembly as defined in claim 13 wherein said plastic backup ring substantially covers the inner wall of said anti-extrusion ring and is composed of a fluoroplastic.

* * * * *